United States Patent

Ming

Patent Number: 5,671,040
Date of Patent: Sep. 23, 1997

[54] SOFT PAD BRIDGE OF SPECTACLES

[75] Inventor: Chen Tsai Ming, Hsin-Chu Hsien, Taiwan

[73] Assignee: Gazelle Corporation, Taipei, Taiwan

[21] Appl. No.: 714,297

[22] Filed: Sep. 18, 1996

[51] Int. Cl.$^6$ ................................................ G02C 5/12
[52] U.S. Cl. ................................ 351/138; 351/136
[58] Field of Search ................................ 351/78, 80, 136, 351/138, 131, 44, 41, 132, 137

[56] References Cited

U.S. PATENT DOCUMENTS 4,848,893  7/1989  Grendol ............................ 351/138

Primary Examiner—Hung X. Dang
Attorney, Agent, or Firm—Morton J. Rosenberg; David I. Klein

[57] ABSTRACT

The present invention provides a soft pad bridge of spectacles, which is essentially divided into an upper and a lower portions as a jogged clamp and a nose saddle. The pad bridge sticks to the bridge of the spectacle frame from the rear end, the nose saddle secured to the bottom end of the bridge of the spectacle frame with a channel preset in the middle section of the nose saddle, and locks in the bridge of the spectacle frame with a snap fastener at the front end. On the other side, the jogged clamp catches the top end of the bridge of the spectacle frame with a bend clamp and secured in the V-shaped recess on the upper bridge of the spectacle frame, and fastened in the bridge with a snap fastener at front inner end. In this manner, the soft pad bridge is fastened on the spectacle frame securely.

3 Claims, 5 Drawing Sheets

SOFT PAD BRIDGE OF SPECTACLES

BACKGROUND OF THE INVENTION

(1) Field of the Invention

The present invention relates to a soft pad bridge of spectacles, and more particularly to a soft pad which keeps the spectacles on the nose of a wearer securely and comfortably.

(2) Prior of Art

Owing to the number of people wearing spectacles is increasing dramatically at recent years, the quality requirements to the spectacles by users is strict which includes accurate focus, a modern design and a comfortable feeling to wear. All such become major considerations to attract consumers. As we know, pad bridge is one of the important factors in relate to the comfort and the contour of a spectacles. A traditional spectacles, as shown in FIG. 5, has a pair of pad bridge linked to the inside legs of the frame by a pair of curved tie leg respectively so that the pad bridges can stand against both sides of the nose smoothly to prop the whole spectacles.

The above-described pad bridge can be competent to prop the whole spectacles to stand on the nose smoothly, but it is easy to find that if the curved tie legs are tortured by an extra force unexpectedly, the pad bridge can not stick on both sides of the nose which causes an uncomfortable feeling in wearing. Furthermore, owing to the joint end between the curved tie leg and the inside leg of the lens frame is so small that it is very easy to break up.

OBJECTS AND SUMMARY OF THE INVENTION

It is the primary object of the present invention to provide a soft pad bridge for a spectacle whose structure is simple.

The present invention provides a soft pad bridge, which comprises a nose saddle and a jogged clamp. Wherein, the nose saddle is shaped in corresponding to the nose shape of a human being, with an inside streamlined concave surface and a streamlined nose top thereof, and a channel crossing the center portion. In the channel, a snap fastener is extending from the middle portion of the front inside wall for locking in a low side triangle slotted hole of the spectacle frame. By embedding two nest ends at the bottom side of the nose saddle into the bottom edge between two back hooks of the spectacle frame, the nose saddle is stuck to the bottom part of the spectacle frame.

The jogged clamp is formed on the top of the nose saddle and sticks to the upper portion of the bridge of the spectacle frame with two arcs at both sides, and extends a bending clamp from the front top portion of the bridge of the spectacle frame downward for embedding into a V-shaped recess formed at the upper portion of the bridge of the spectacle frame, and a snap fastener extending from the back side thereof can lock into a triangle slotted hole on the V-shaped recess. Therefore the pad bridge can be fastened on the spectacle frame steady with the two snap fasteners, as upper and low snap fasteners.

DETAILED DESCRIPTION OF PREFERRED EMBODIMENTS

Figure 1:
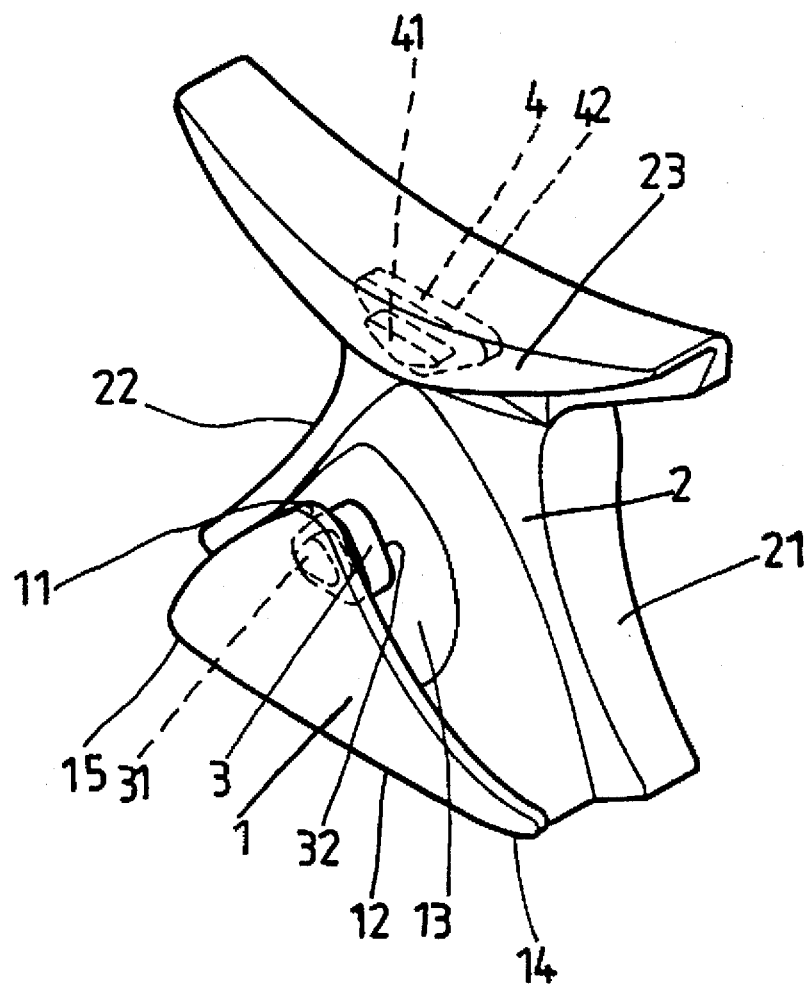
FIG. 1 is a perspective view of the present invention.
Figure 2:
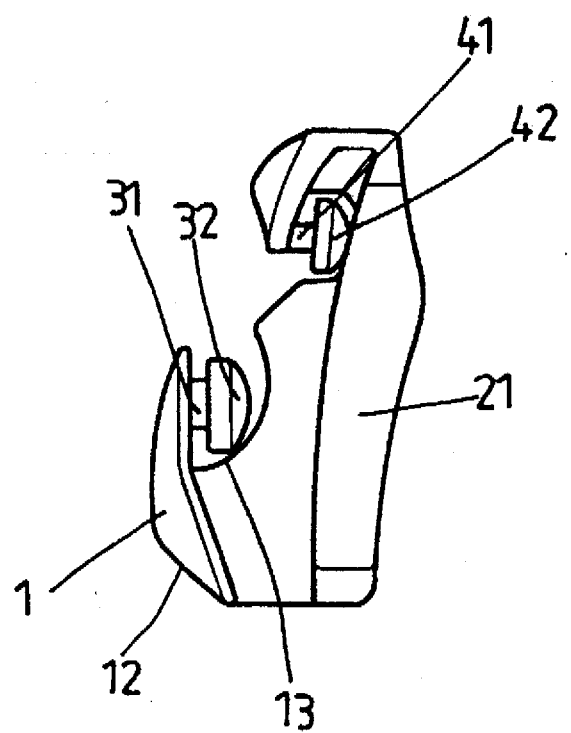
FIG. 2 is a side view of the present invention.
Figure 4:
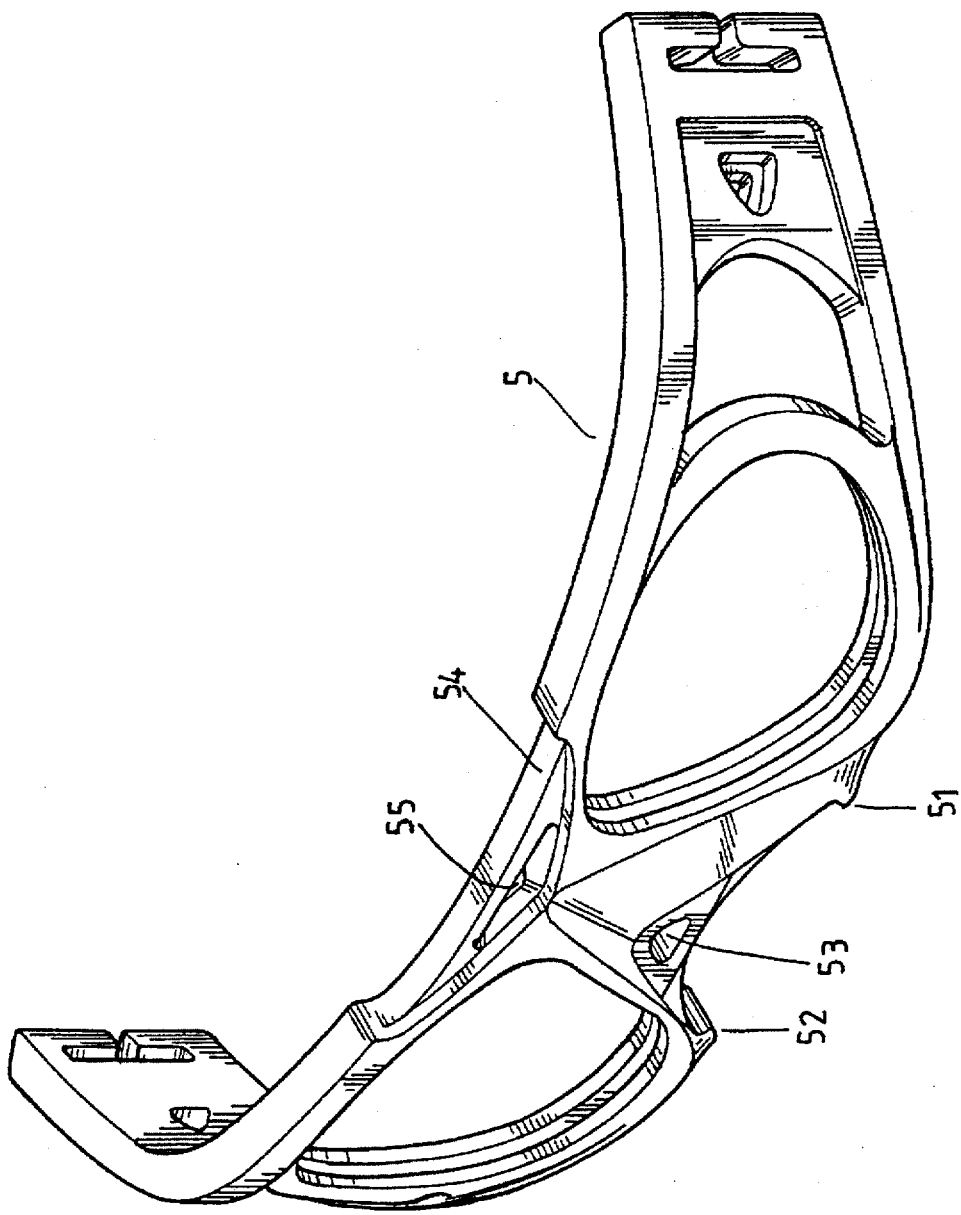
FIG. 4 is a solid view showing a spectacle frame.
Figure 5:
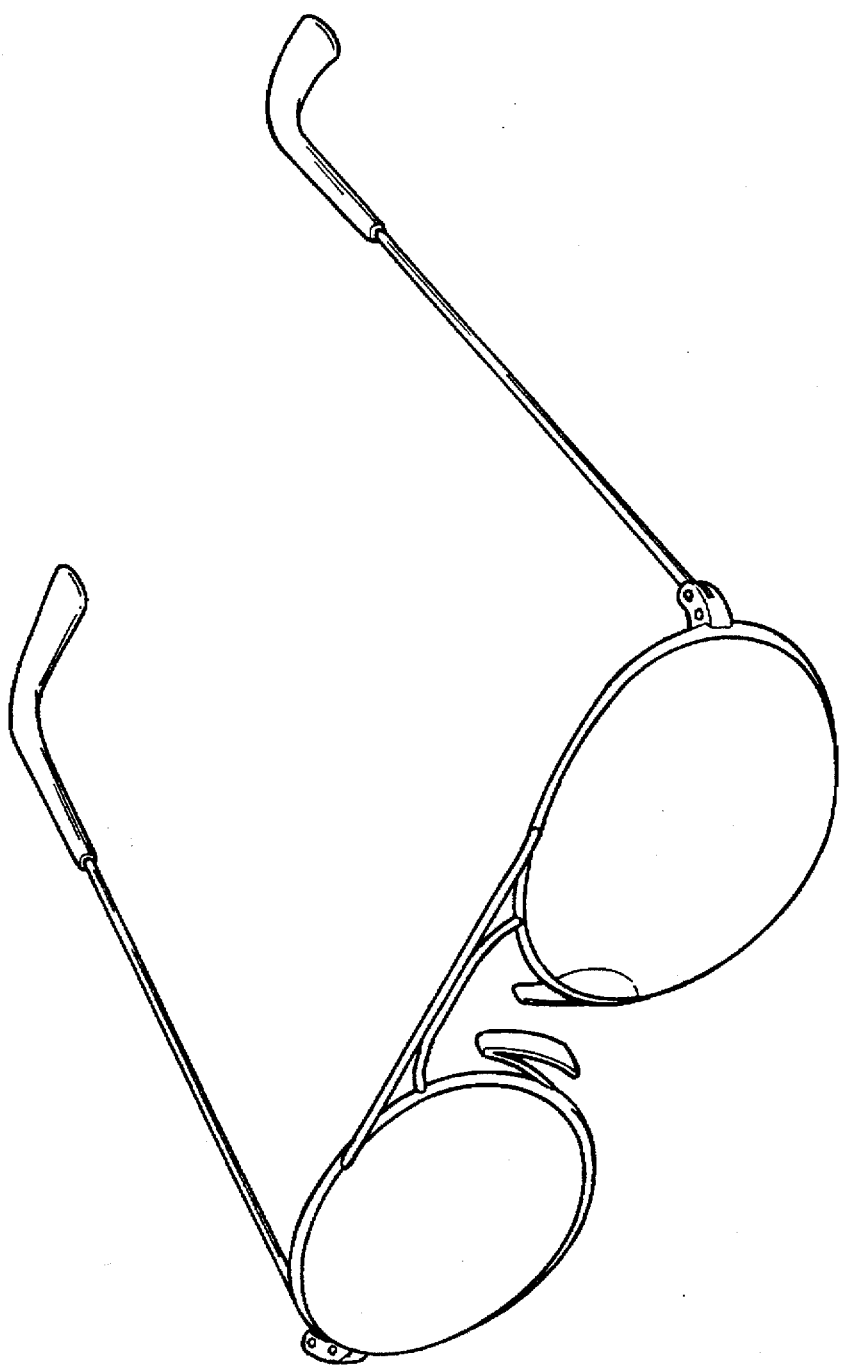
FIG. 5 is a solid view showing one conventional spectacles.

Referring to FIG. 1 and FIG. 2, the present invention provides a soft pad bridge which is essentially composed of a nose saddle 1 and a jogged clamp 2, and clamp on a spectacle frame 5, as shown in FIG. 4.

The nose saddle 1 has a contour to fit a human's nose, and includes a concave surface 12 at the inner bottom portion, a streamline nose 11 on the upper portion, and a channel 13 crossing the middle section and a snap fastener 3 extending from the center portion of the front wall in the channel 13 to the rearward. The snap fastener 3 is composed of a triangle pin 31 at one side and propping a triangle curved lock head 32 at the opposite side. There are two nest ends 14 and 15 along both sides stretching to the bottom ends.

The jogged clamp 2 is integrally formed on top of the nose saddle 1 having two arcs 21 and 22 at respective sides corresponding in shapes to the inner respective edges of the upper portion of the spectacle frame 5 for sticking thereon, a bend clamp 23 extending forward and downward from the top portion to cover the bridge of the spectacle frame 5 having formed a snap fastener 4 at the inner end thereof. The snap fastener 4 comprises a triangular pin 41 extending from the front end and a triangular curved lock head 42 propping from the opposite end thereof.

Figure 3:
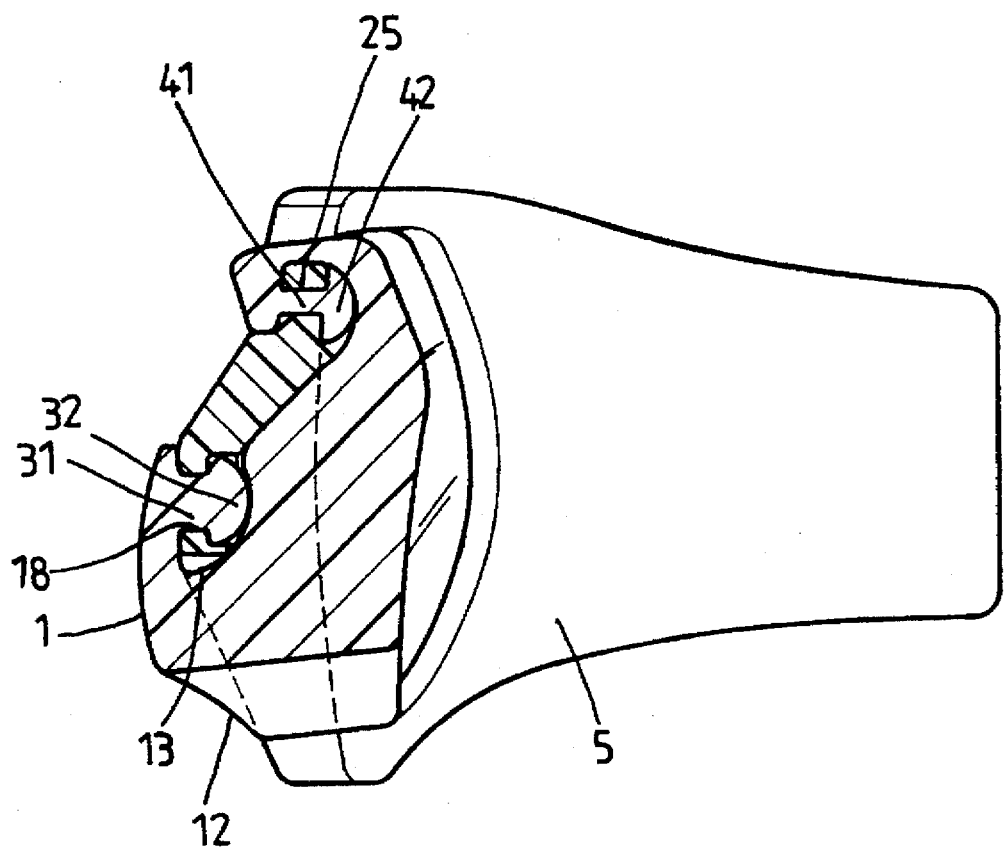
FIG. 3 is cross-section view showing an operation in combining state of the present invention.

In combining, referring to FIG. 1 and FIG. 3 cooperating to FIG. 4, the nose saddle 1 is pushed from the rear bottom end of the bridge of the spectacle frame 5 toward the front end which forces the two nest ends 14 and 15 embedded into the space between a pair of back hooks 51 and 52 at the bottom of the bridge of the spectacle frame 5 so that the snap fastener 3 engages with the triangular slotted hole 53 of the spectacle frame 5. Then pushing the jogged clamp 2 upwardly on the spectacle frame 5 to cover the top portion of the bridge of the spectacle frame 5 so that the bend clamp 23 embeds into a V-shaped recess 54 on the top of the bridge of the spectacle frame 5, and forcing the snap fastener 4 engaging with the triangular slotted hole 55 of the spectacle frame 5.

I claim:

1. a soft pad bridge of spectacles including two parts, as a nose saddle and a jogged clamp; wherein:

said nose saddle having a channel crossing the middle section, a saddle concave surface extending from the inner bottom end, and a first snap fastener extended from the inner front wall of said channel and the improvements comprising; said jogged clamp having two arcs at respective sides, a bend clamp extending downward from the top of a spectacle frame to cover the upper portion of said spectacle frame, and a second snap fastener integrally formed on the inner end of said bend clamp.

2. A soft pad bridge of spectacles, as recited in claim 1, wherein said first and second snap fasteners each comprising a triangular pin at the front portion and a triangular curved lock head propping out from the rear end opposing said triangular pin.

3. A soft pad bridge of spectacles, as recited in claim 1, wherein said nose saddle having two nest ends along respective sides stretching from the top to the bottom ends for embedding into the space between a pair of back hooks at the bottom end of said spectacle frame.

* * * * *